(12) United States Patent
Ovadia et al.

(10) Patent No.: US 11,402,892 B2
(45) Date of Patent: Aug. 2, 2022

(54) DEVICE POWER SAVINGS AND EXTENDED TELEMTRY MESSAGING

(71) Applicant: Charter Communications Operating, LLC, St. Louis, MO (US)

(72) Inventors: Shlomo Ovadia, Denver, CO (US); Michael J. Kloberdans, Brighton, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 134 days.

(21) Appl. No.: 16/740,873

(22) Filed: Jan. 13, 2020

(65) Prior Publication Data

US 2021/0216131 A1 Jul. 15, 2021

(51) Int. Cl.
| | | |
|---|---|---|
| G06F 1/00 | (2006.01) | |
| G06F 1/3246 | (2019.01) | |
| G06F 1/329 | (2019.01) | |
| H02J 9/06 | (2006.01) | |
| H04W 52/02 | (2009.01) | |
| H04M 19/08 | (2006.01) | |
| G06F 1/3206 | (2019.01) | |

(52) U.S. Cl.
CPC .......... *G06F 1/3246* (2013.01); *G06F 1/3206* (2013.01); *G06F 1/329* (2013.01); *H02J 9/06* (2013.01); *H04M 19/08* (2013.01); *H04W 52/0261* (2013.01)

(58) Field of Classification Search
CPC ...... G06F 1/3246; G06F 1/329; G06F 1/3206; H02J 9/06; H04W 52/0261; H04M 19/08
See application file for complete search history.

(56) References Cited

U.S. PATENT DOCUMENTS

| | | | | |
|---|---|---|---|---|
| 9,032,231 B1* | 5/2015 | Crisp | ................ | H04L 12/2834 713/323 |
| 2003/0135773 A1* | 7/2003 | Zhang | ...................... | G06F 1/28 713/340 |
| 2004/0057576 A1* | 3/2004 | Lavaud | ................. | H04M 19/08 379/413 |
| 2006/0274764 A1* | 12/2006 | Mah | ...................... | G06F 1/3287 370/401 |
| 2008/0159744 A1* | 7/2008 | Soto | ...................... | H04M 19/08 398/115 |
| 2013/0191663 A1* | 7/2013 | Overcash | ................ | G06F 1/325 713/320 |
| 2017/0142048 A1* | 5/2017 | Tyagi | ................ | H04W 52/0212 |

* cited by examiner

*Primary Examiner* — Xuxing Chen
(74) *Attorney, Agent, or Firm* — Armis IP Law, LLC

(57) ABSTRACT

This disclosure introduces a novel device-initiated power saving scheme that enables the device (such as a ONU or other suitable entity) to achieve efficiencies during power emergencies and enables new communication features with a communication management resource (such as an OLT or other suitable entity) and the monitoring of systems deep in a service provider's network. Additionally, the new power saving techniques as described herein are fully compatible with existing operational power saving methods. Further, new messages supporting telemetry data can be used to plan back office support expansion needs, identify subscribers that are eligible for enhanced service offers and other uses. Finally, this disclosure includes new telemetry messaging techniques to provide novel notification of a system status.

48 Claims, 9 Drawing Sheets

900

OPERATE A COMMUNICATION DEVICE IN A NORMAL OPERATIONAL MODE IN WHICH THE COMMUNICATION DEVICE IS POWERED VIA A MAIN POWER SOURCE, THE COMMUNICATION DEVICE SUPPORTING VOICE COMMUNICATIONS OVER A COMMUNICATION LINK VIA FIRST CIRCUITRY AND NON-VOICE COMMUNICATIONS VIA SECOND CIRCUITRY — 910

FROM A POWER MANAGEMENT RESOURCE, RECEIVING NOTIFICATION INDICATING THAT THE COMMUNICATION DEVICE IS POWERED VIA A BATTERY BACKUP SOURCE INSTEAD OF THE MAIN POWER SOURCE — 920

IN RESPONSE TO RECEIVING THE NOTIFICATION, DEPOWER THE SECOND CIRCUITRY AND POWER THE FIRST CIRCUITRY OF THE COMMUNICATION DEVICE — 930

IF THE MAIN POWER SOURCE IS RESTORED, THE CONTROLLER WILL RECEIVE A NOTIFICATION FROM THE POWER MANAGEMENT SYSTEM TO POWER-UP THE SECOND CIRCUITRY OF THE COMMUNICATION DEVICE, WHICH IS OPERATING IN BATTERY BACKUP MODE. — 940

| Leaf (HEX) | Attribute | Read/Write | Descriptio |
|---|---|---|---|
| D-ONU Management | | | |
| 0X0016 | Reset UPS | R/W | Send a message to reset the external UPS (EBBU or other) |

410 ⟵ (pointing to 0X0016)

400

Battery Backup Management

| DPoE Event Code | Value (Hex) | Description | Relevant Object |
|---|---|---|---|
| On Battery | 0x51 | ONU switched to battery power | ONU |
| Low Battery | 0x52 | ONU battery charge capacity at or less than BatteryLowThreshold but above the BatteryDepletedThreshold | ONU |
| Depleted Battery | 0x53 | ONU battery charge capacity at or less than BatteryDepletedThreshold | ONU |
| Battery Output Voltage | 0x54 | The ONU battery output voltage. | ONU |
| Remaining Battery Capacity | 0x55 | Remaining ONU battery capacity in use (minutes). | ONU |
| Battery Number | 0x56 | The ONU battery number in use inside the EBBU. | ONU |
| Reserved | 0x54-7F | Reserved | |

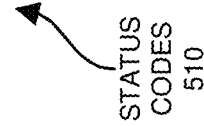

STATUS CODES 510

FIG. 5

| Home Support Management | | | |
|---|---|---|---|
| DPoE Event Code | Value (Hex) | Description | Relevant Object |
| I-ATA Off hook | 0x63 | Phone attached to I-ATA off hook | ONU |
| E-ATA Off hook | 0x64 | Phone attached to external ATA off hook | ONU |
| CPU Utilization | 0x65 | ONU main instantaneous CPU utilization | ONU |
| CPU Temperature | 0x66 | ONU main CPU instantaneous temperature | ONU |
| Reserved | 0x55-7F | Reserved | |

STATUS CODES 610

FIG. 6

| UPS Statistics DPoE Attributes, Branch 0xD7 | | | |
|---|---|---|---|
| Leaf (Hex) | Attribute | Read/Write | Description |
| 0x0A01 | UPS Present | R | D-ONU Detected External UPS |
| 0x0A02 | UPS Manufacturer | R | UPS Manufacturer |
| 0x0A03 | UPS Model Number | R | UPS Model Number |
| 0x0A04 | UPS Software Version | R | UPS Software Version |
| 0x0A05 | UPS Serial Number | R | UPS Serial Number |
| 0x0A06 | UPS Battery Status | R | UPS Battery Status |
| 0x0A07 | UPS Charge Capacity Remaining | R | Amount of Charge Capacity remaining on Battery |
| 0x0A08 | UPS Alarm Thresholds | R/W | UPS Alarm thresholds for reporting low or depleted battery levels |

STATUS INFO. 710

FIG. 7

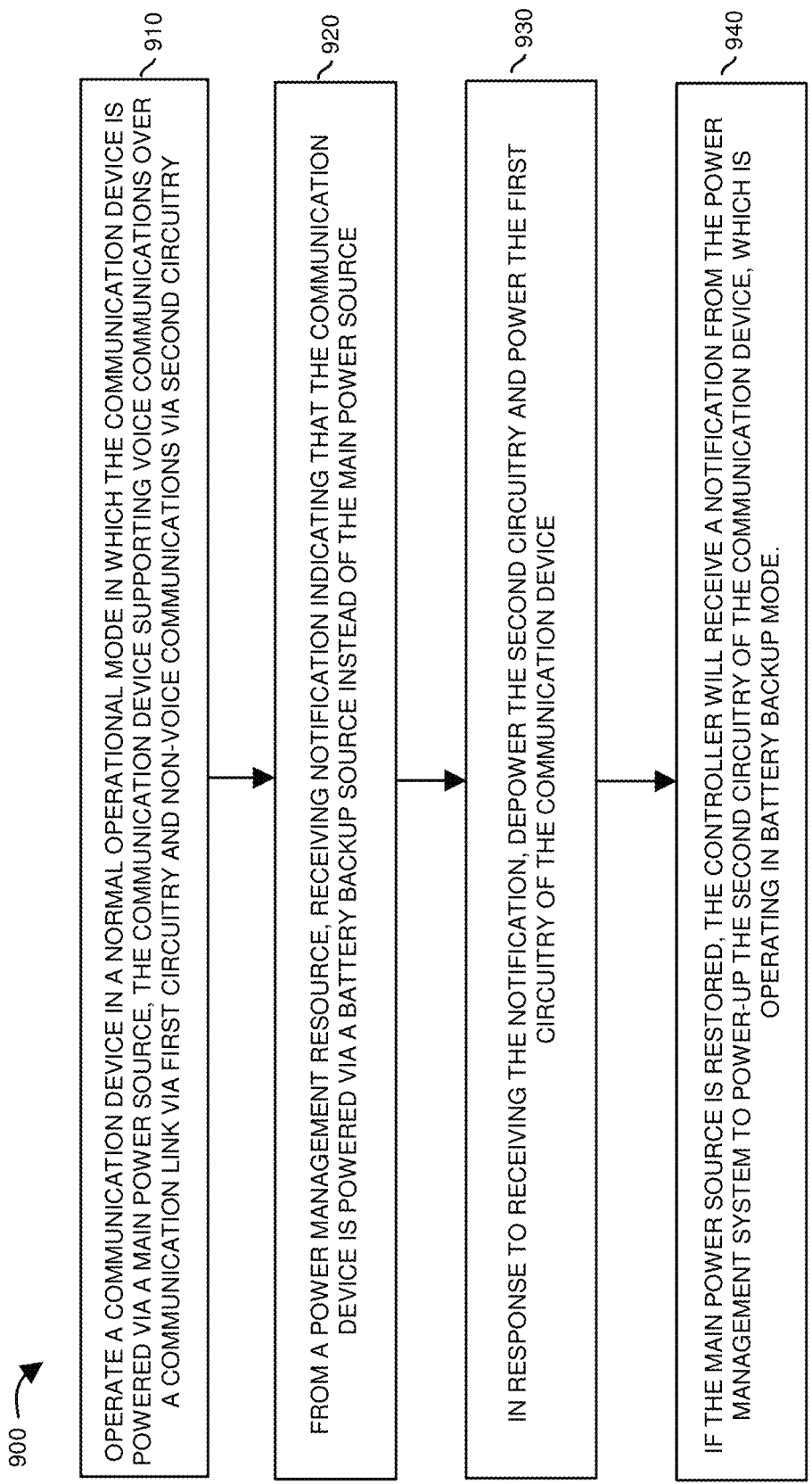

DEVICE POWER SAVINGS AND EXTENDED TELEMTRY MESSAGING

BACKGROUND

During a loss of Mains power, a conventional External Backup Battery Unit (EBBU) connected to an Optical Network Unit (ONU) supplies power but has little or no communication through the vCM to backend monitoring systems in the Optical Line Terminal (OLT) regarding battery power levels. During normal operation, the ONU is unable to send battery alarms through the OLT/vCM, to respond to status queries or confirm that firmware upgrades or a battery firmware reboot was successful. Communications between the EBBU and the OLT/vCM cannot take place because there are no defined Operation Administration and Management (OAM) messages to convey that information.

Conventional ONU-initiated power saving schemes are vendor proprietary and are based on reducing ONU power consumption during normal operations. This provides better energy efficiency. The FCC has mandated that Internet Service Providers (ISPs) furnish at least 24-hours of backup power during a Mains power outage. However, few solutions, if any, reduce ONU power consumption during a Mains power outage while still allowing emergency phone calls.

Additionally, while the EBBU is used as the primary example of a device attached to the ONU, the principles and need for new OAM messages equally apply to any adjunct that is connected to the ONU, such as external storage (USB, NAS, SD cards, etc.), call blocking/filtering devices, smart power supply units (PSU), IoT (Internet of Things) devices, Telemetry adjuncts (physical or software) and others.

In general, conventional power saving schemes are classified into three categories:

1. Power Shedding—ONU initiated disabling of unused Universal Network Interfaces (UNIs) such as MoCA (Multimedia over Coax Alliance) or RF (Radio Frequency). Power Shedding has a minimal impact on power savings because unused interfaces are not a major power consuming source.
2. Power Doze—OLT initiated disabling non-essential ONU functions and the optical transmitter (TX), but leaves the optical receiver (RX) operational.
3. Power Sleep—OLT initiated Deep or Fast Sleep can disable non-essential ONU functions and also both the optical RX and TX during negotiated time slots.

According to conventional techniques, Power Doze and Sleep derive most of the power savings by deactivating respective optical TX/TRX components during specified time slots.

BRIEF DESCRIPTION OF EMBODIMENTS

Embodiments herein provide improved power saving such as during battery backup or normal operation.

More specifically, one embodiment herein includes operating a (telephony) communication device during normal operation in which the communication device is powered via a main power source (such as based on Mains power). During the normal operation, the communication device (such as a communication system in a subscriber domain) supports voice communications over a communication link via first circuitry and non-voice communications via second circuitry. Assume that a controller of the communication device receives notification from a power management resource (such as an external battery backup unit coupled to the communication device), the notification indicating that the communication device is powered via a battery backup source instead of the main power source. In response to receiving the notification of being powered from the battery backup source, the controller associated with the communication device depowers the first circuitry (such as non-voice communication circuitry) and powers the second circuitry (voice communication circuitry) of the communication device.

In accordance with further embodiments, during a main power outage in which the communication device is powered via the battery backup resource instead of the main power source, the controller of the communication device continuously powers both a transmitter interface (such as an optical transmitter) and a receiver interface (such as an optical receiver) of the communication device that provides phone connectivity through the communication device over the communication link to a remote destination.

In accordance with yet further example embodiments, the controller operates the communication device in a first power saving mode during the normal operation; the controller operates the communication device in a second power saving mode during a battery backup mode in which the communication device is powered via the battery backup source instead of the main power source. In one embodiment, the controller implements variable power saving settings of the communication device during the second power saving mode (when on battery backup) depending on prior detected conditions of operating the communication device in the normal mode.

Yet further embodiments herein include, during a battery backup mode in which the communication device is powered via the battery backup source instead of the main power source, the controller communicates a message over the communication link to a communication management resource. The communicated message notifies the communication management resource (such as an OLT) that the communication device is operating in the battery backup mode. The controller then receives communications over the communication link from the communication management resource. The received communications control settings of the communication device during the battery backup mode.

In accordance with still further embodiments, during a battery backup mode in which the communication device is powered via the battery backup source instead of the main power source, assume that the controller detects an event associated with the battery backup source. In response to detecting the event, the controller communicates a message over the communication link to a communication management resource. Such a message notifies the communication management resource of the event. In one embodiment, the event is detection of available power left in the battery backup source being below a threshold value. In response to the event, the controller receives control communications over the communication link from the communication management resource. In accordance with the control communications, the controller controls settings of the communication device during the battery backup mode in response to receiving notification of the event. The controller implements the settings as specified by the communications. The implemented settings further reduce power consumption by the communication device in the battery backup mode.

In accordance with yet further example embodiments, the communication management resource is operative to: i) retrieve usage information associated with the communication device, ii) analyze usage of the communication device and corresponding ports during the normal operation (and possible the battery backup mode as well), and iii) produce the communications controlling settings of the communication device.

Yet further embodiments herein include, via an agent executing in the communication device during a battery backup mode in which the communication device is powered via the battery backup source, monitoring a status of a phone device coupled to the communication device and communicating a message from the agent over the communication link to a communication management resource. The message indicates a status of the respective use of the phone device. In one embodiment, the status from the agent indicates an amount of usage of the phone device. In yet further example embodiments, the communication device can be configured to receive an offer for one or more services depending on the status of the phone device as monitored and detected by the agent.

In accordance with still further embodiments, the communication device receives a command to perform a test while in a battery backup mode in which the communication device is powered via the battery backup source instead of the main power source. In response to receiving the command, the communication device initiates execution of a performance test that tests an ability of a respective communication interface to communicate over the communication link. Subsequent to completion of the test, the communication device then communicates a message over the communication link to a communication management resource; the message indicates completion of the test.

Further embodiments herein include, during a battery backup mode in which the communication device is powered via the battery backup source, the controller receives a command over the communication link. The controller communicates the command to the power management resource. The power management resource executes the commands. Additionally, the communication device communicates a confirmation message over the communication link; the confirmation message indicates execution of the command by the power management resource.

Yet further example embodiments herein include receiving a communication from the power management resource during a battery backup mode in which the communication device is powered via the battery backup source, the communication indicating a status of the power management resource. The power management resource transmits the communication from the communication device over the communication link to a communication management resource.

In accordance with still further embodiments, the controller monitors an attribute of the communication device during a battery backup mode in which the communication device is powered via the battery backup source; the controller produces status information associated with the monitored attribute and communicates the status information over the communication link to a destination device.

In accordance with more specific example embodiments, this disclosure includes ONU (Optical Network Unit)—Initiated Emergency and Non-Emergency Power Savings and New OAM (Operation Administration and Management) Messaging. For example, one embodiment herein introduces a novel ONU-initiated power saving scheme that enables the ONU to achieve efficiencies during emergencies and enables new communication features with the OLT and the monitoring systems deeper in the CSP's (Communications Service Provider) network. Additionally, the new power saving control is fully compatible with existing operational power saving methods. New messages supporting telemetry data can be used to plan back office support expansion needs, as well as identify subscribers that are eligible for enhanced service offers and other uses. Additionally, embodiments herein include new OAM messaging that is compliant with an OAM specification.

Embodiments herein are useful over conventional techniques. For example, power saving functionality as described herein provides substantial power savings over conventional techniques during a respective power outage.

Note that any of the resources as discussed herein can include one or more computerized devices, mobile communication devices, communication device, controller, sensors, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon. The instructions, when executed by the computer processor hardware, cause the computer processor hardware (such as one or more co-located or disparately processor devices or hardware) to: operate a communication device in a normal operational mode in which the communication device is powered via a main power source, the communication device supporting voice communications over a communication link via first circuitry and non-voice communications via second circuitry; from a power management resource, receive notification indicating that the communication device is powered via a battery backup source instead of the main power source; and in response to receiving the notification, depower the second circuitry and powering the first circuitry of the communication device.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing improved use of battery backup resources during a respective power outage. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

FIG. 5 is an example diagram illustrating battery backup management notifications according to embodiments herein.

FIG. 6 is an example diagram illustrating subscriber domain management and messaging according to embodiments herein.

FIG. 7 is an example diagram illustrating battery backup information according to embodiments herein.

FIG. 9 is an example diagram illustrating a method according to embodiments herein.

Figure 1:
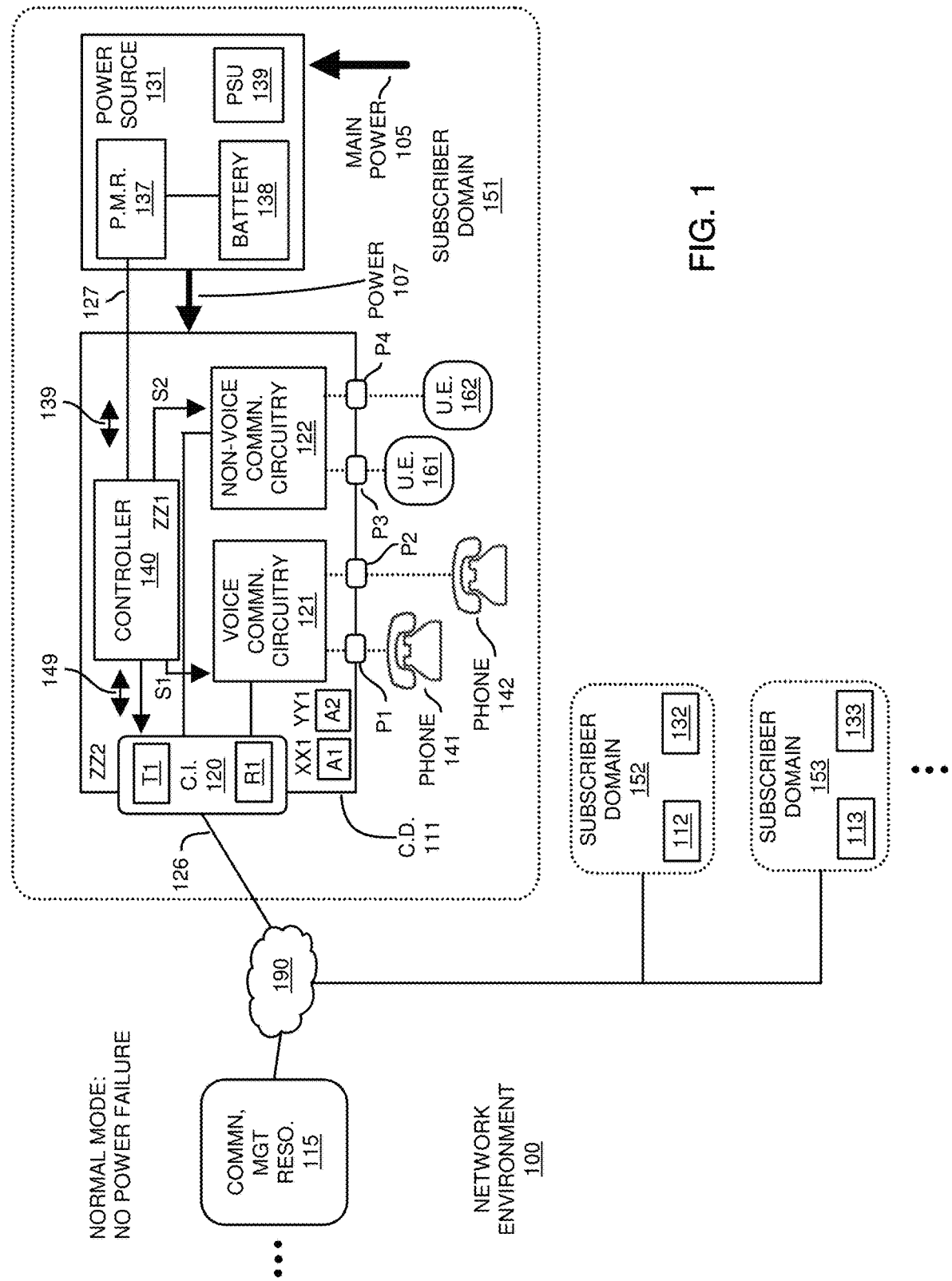
FIG. 1 is an example diagram illustrating operation of a subscriber domain and corresponding user-operated devices during a normal power mode according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DESCRIPTION OF EMBODIMENTS

A system includes a communication device and a controller (such as a communication management resource). The communication device includes: i) first circuitry supporting voice communications, and ii) second circuitry supporting non-voice communications. As its name suggests, the controller controls operation of the communication device and powering and depowering of circuitry. For example, during a normal operation in which the communication device is powered via a main power source, the controller powers both the first circuitry and the second circuitry. Assume that the controller receives, from a power management resource, a notification indicating that the communication device is being powered via a battery backup source instead of the main power source. In such an instance, in response to receiving the notification, the controller implements power savings via continued powering of the first circuitry (voice communication circuitry) and depowering the second circuitry (non-voice communication circuitry) of the communication device.

Now, more specifically, FIG. 1 is an example diagram illustrating operation of a subscriber domain and corresponding user-operated devices during a normal power mode according to embodiments herein.

In this example embodiment, the network environment 100 includes communication management resource 115, network 190, and multiple subscriber domains 151, 152, 153, etc.

Each subscriber domain in network environment 100 includes a respective communication device and power source providing power management and battery backup.

For example, subscriber domain 151 includes communication device 111 (communication system) and corresponding power source 131; subscriber domain 152 includes communication device 112 and corresponding power source 132; subscriber domain 153 includes communication device 113 and corresponding power source 133; and so on.

As further shown, the power source 131 includes battery 138, power supply unit 139 (PSU), and power management resource 137.

Power source 131 is generally powered by main power 105 (such as 120 VAC wall power) during non-power failure conditions.

In the normal mode, the received main power 105 is used for multiple purposes. For example, the received main power 105 charges battery 138 during a normal mode when there is no power failure. Additionally, during the normal mode, when there is no power failure, the power source 131 derives the power signal 107 supplied to the communication device 111 from the main power 105 through the use of the power supply unit 139. In one non-limiting example embodiment, power source 131 includes a voltage converter (power supply unit 139) operable to convert the main power 105 (such as 120 volts AC from Mains power or grid power or power from another suitable resource) into power 107 (such as one or more DC voltages).

As further shown, communication device 111 includes communication interface 120, controller 140, agent A1, agent A2, voice communication circuitry 121, and non-voice communication circuitry 122.

Communication interface 120 provides connectivity of the communication device 111 to the network 190, which can be any suitable type of network. In one nonlimiting example embodiment, the network 190 is a passive optical network (a.k.a., PON) supporting communications between the communication management resource 115 and the communication device 111.

As its name suggests, the voice communication circuitry 121 (when powered such as under normal conditions when there is no power failure) provides connectivity (via voice communications) of the phones (phone 141, phone 142, etc.) to remote phone devices (in a remote network) via communications through communication interface 120, network 190 and communication management resource 115.

As a more specific example, phone device 141 is coupled to the voice communication circuitry 121 through the port P1. During a respective phone call, the phone device 141 transmits and receives data or phone signals over a communication path including port P1, voice communication circuitry 121, communication interface 120, communication link 126, network 190 and communication management resource 115.

Phone device 142 is coupled to the voice communication circuitry 121 through the port P2. During a respective phone call, the phone device 142 transmits and receives data or phone signals over a communication path including port P2, voice communication circuitry 121, communication interface 120, communication link 126, network 190 and communication management resource 115.

Additionally, as its name suggests, the non-voice communication circuitry 122 (when powered in the normal mode) provides connectivity (such as via non-voice data communications) of the user equipment 161 and 162 (such as set top box, computers, communication devices, playback devices, etc.) to entities such as server resources that distribute content in a network environment 100.

For example, during a respective communications session, the user equipment 161 transmits and receives data over a communication path including port P3, non-voice communication circuitry 122, communication interface 120, communication link 126, network 190, and communication management resource 115.

During a respective communications session, the user equipment 162 transmits and receives data over a communication path including port P4, non-voice communication circuitry 122, communication interface 120, communication link 126, network 190, and communication management resource 115.

Each of the communication devices 112, 113, etc., and corresponding power sources 132, 133, etc., operate in a similar manner as the communication device 111 and corresponding power source 131.

In yet further example embodiments, the communication device 111 (assigned network address ZZ2) includes a controller 140 (such as assigned unique identifier value or unique network address ZZ1).

As its name suggests, controller 140 manages and/or controls the components in communication device 111 as well as corresponding communications. For example, when the communication device 111 operates in normal mode in which the power source 131 provides power 107 using the power supply unit 139 derived from the main power 105, the controller 140 (via generation of signals and S2 applied to respective circuitry) powers both voice communication circuitry and non-voice communication circuitry 122 via the power 107 from power source 131.

Thus, when the voice communication circuitry 121 is powered via energy provided by main power 105, the voice communication circuitry 121 enables users in the subscriber domain 151 to establish phone calls with remote phone devices via use of phones 141 and 142. When the non-voice communication circuitry 122 is powered via energy provided by main power 105, the non-voice communication circuitry 122 enables users operating user equipment 161 and 162 in the subscriber domain 151 to retrieve and transmit data.

Figure 2:
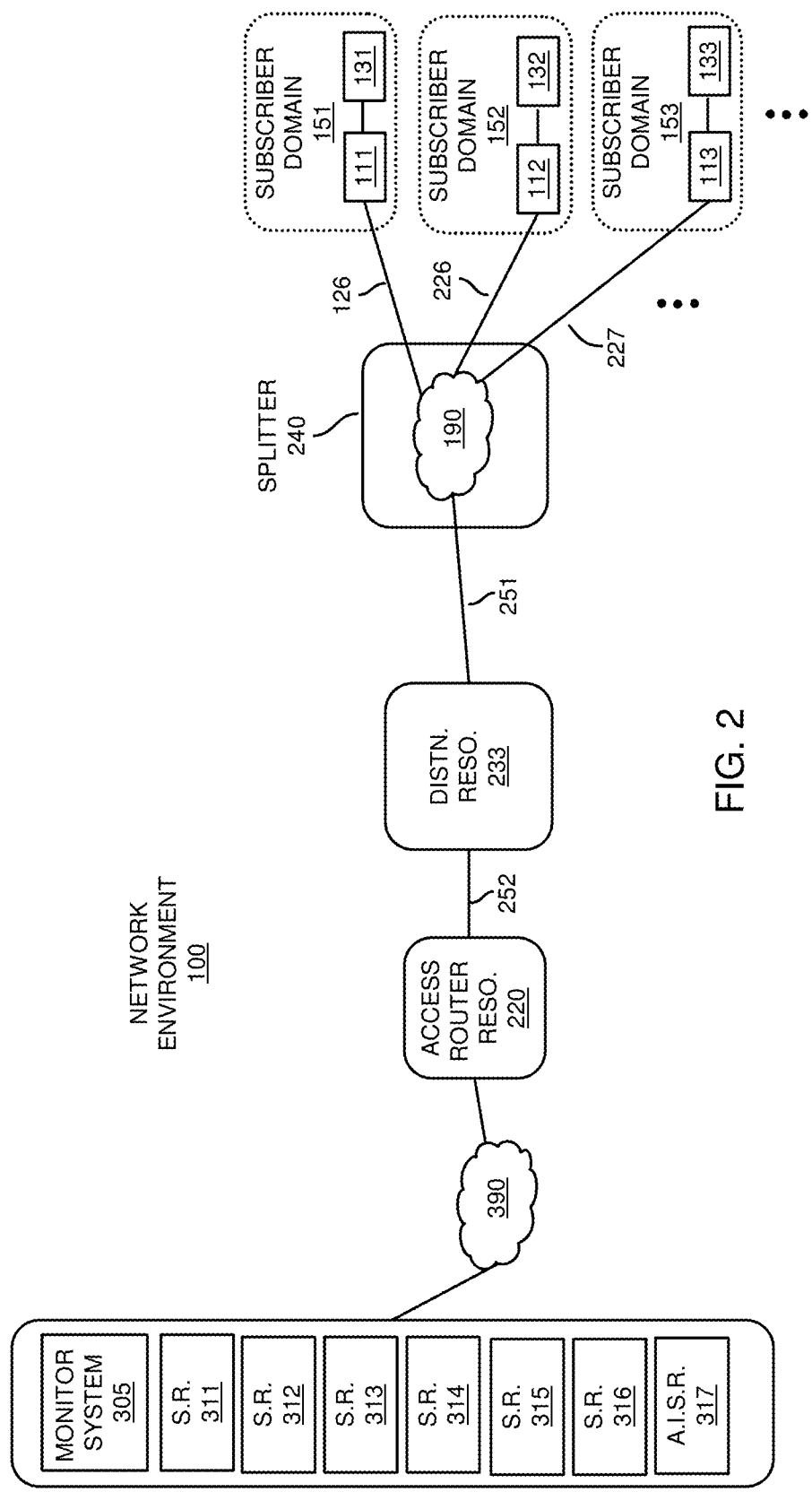
FIG. 2 is an example diagram illustrating multiple subscriber domains, communication devices, and corresponding battery backup resources according to embodiments herein.

FIG. 2 is an example diagram illustrating multiple subscriber domains and a wider view of the network environment according to embodiments herein.

Network environment 100 (such as based on a star topology) includes multiple subscriber domains 151, 152, 152, etc., including corresponding communication devices 111, 112, 113, etc., and power management resources 131, 132, 133, etc. Each communication device is in communication with distribution resource 233 (such as an OLT) via connectivity (such as a fiber optic link or other suitable resource) to splitter 240; splitter is coupled to the distribution resource 233 via communication link 251 (such as one or more fiber optic links). In accordance with further embodiments, the communication link 252 supports DWDM (Dense Wavelength Division Multiplexing) between access router 220 (such as in a headend). Network 390 provides connectivity to back office servers.

Note that the communication management resource represents or be located at any of one or more resource such as distribution resource 233 (such as ONU), access router 220, and/or server resources 311, 312, etc.

In one embodiment, the distribution resource 233 (such as OLT or other suitable one or more entities) is in communication with network 390 via the access router 220. In such an instance, the network 390 provides connectivity to one or more server resources such as server resource 311 (such as a Domain Name Server), server resource 312 (such as a Dynamic Host Configuration Protocol server), server resource 313 (such as a Simple Network Management Protocol server), server resource 314 (such as a Trivial File Transfer Protocol server), server resource 315 (such as a SysLog server), and server resource 316 (such as a Time Server).

The following figures illustrate operation of the communication device during a respective battery backup mode when main power 105 is lost.

Figure 3:
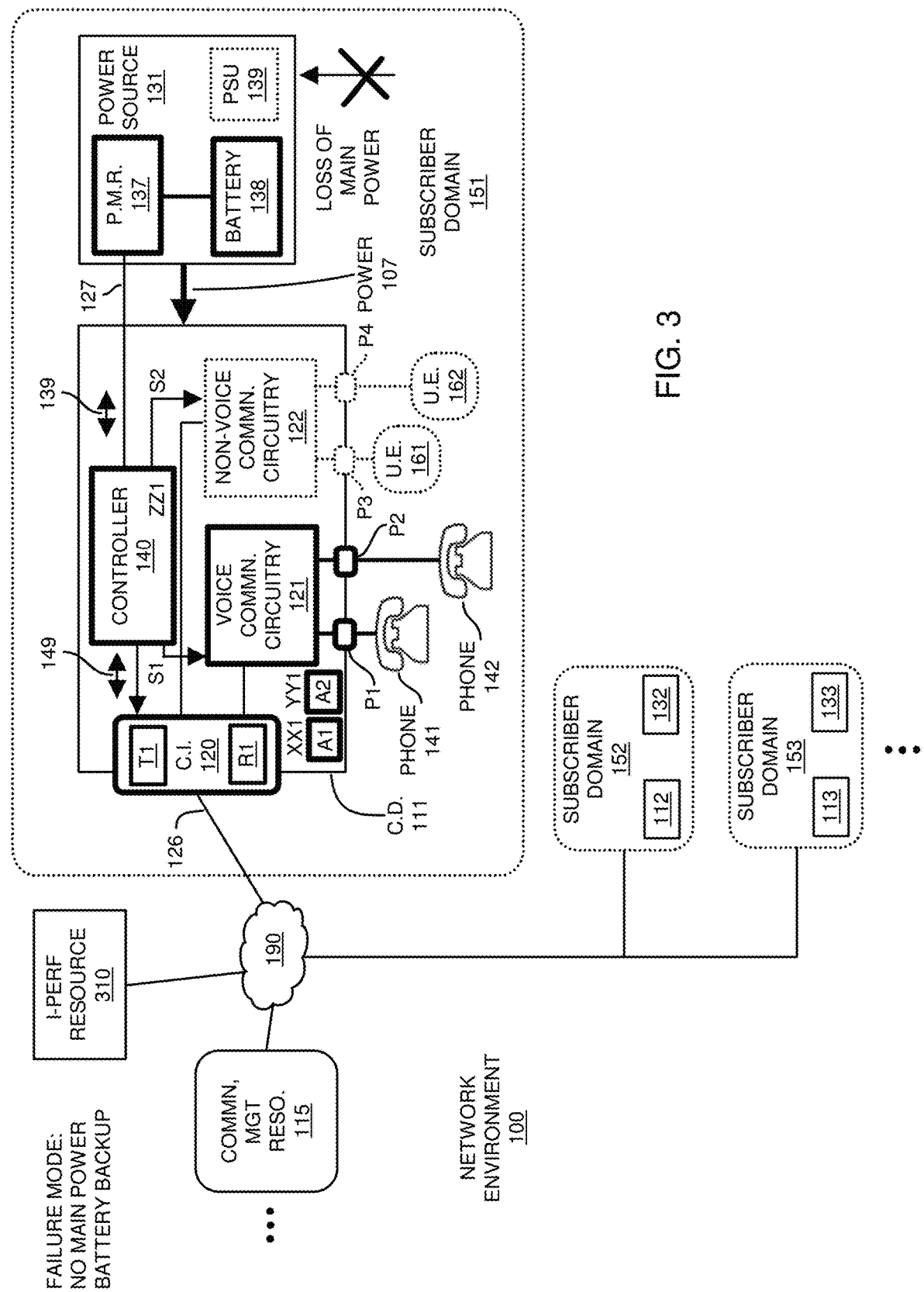
FIG. 3 is an example diagram illustrating operation of a subscriber domain and corresponding user-operated devices during a battery backup power mode according to embodiments herein.

FIG. 3 is an example diagram illustrating operation of a subscriber domain and corresponding user-operated devices during a battery backup power mode according to embodiments herein.

Section A

In one embodiment, power saving initiated by the controller 140 (such as ONU) applies only during periods of a main power outage in which main power 105 becomes unavailable. Unlike conventional Power Shedding power savings, embodiments herein include disabling most of the communication device 11 functions (ONU functions, not just inactive UNIs), but retaining the functionality of voice communication circuitry 121, port P1, port P2, etc., (such as including FXS ports, whether integrated in the communication device 111 or externally attached via add-on circuit to a main circuit board of the communication device 111) and the optical receiver R1/transmitter T1. In such an instance, the communication device 111 enables telecommunications access (such as phone access via phone devices 141 and 142). In one embodiment, reducing the number of electronic components associated with communication device 111 powered by power source 131 during the battery backup mode in which the communication device 111 is powered solely by battery 138. Therefore, this idea focuses on preserving FSX line access by reducing the power load on the EBBU (power source 131) by deactivating any function in the communication device 111 that doesn't support phone calls.

As shown in FIG. 3, during the main power failure (such as during a Mains power outage when main power 105 is not available), the controller 140 (controller) controls powering/depowering of the different components associated with communication device 111. For example, via appropriate control signals, during the main power failure, the controller 140 depowers non-voice communication circuitry 122, and corresponding ports P3 and P4, etc.

In one embodiment, during battery backup, the communication management resource 111 further controls (and provides) delivery of power to components such as agents A1, A2, voice communication circuitry 121, communication interface 120, transmitter T1, receiver R1, communication interface 120, etc.

Depowering and powering of respective circuitry in communication device 111 depending on whether the communication device 111 operates on battery backup allows for certain needed functions such as phone calls and disabling of non-critical functions such as provided by ports P3, P4, non-voice communication circuitry transmitter T1, receiver R1, etc., during battery backup. In one embodiment, these functions are controlled based on artificial intelligence feedback from a monitoring system.

In one embodiment, Ethernet data ports of communication device 111 (such as P3 and P4) are disabled during a mains power outage (i.e., loss of power 105) which preserves the charge of battery 138 for phone calls (both received over R1 and transmitted over T1). In accordance with further embodiments, note that any components can be disabled/depowered during a main power outage such as LEDs and other non-essential adjuncts that might be attached to the communication device 111. Some examples of non-essential adjuncts that are depowered during battery backup mode include storage devices, telemetry functions, IoT devices, etc.

In one nonlimiting example embodiment, during the battery backup mode in which the communication device 111 is powered via the battery 138 instead of the main power 105 (which is unavailable), the controller 140 continuously powers both a transmitter interface (such as T1) and a receiver interface (such as R1) of the communication interface 120. This enables the communication device 140 that provides phone connectivity through the communication devices 141 and 142 over the communication link to a remote destination.

Note that further embodiments herein include operating the communication device 111 in a first power saving mode during the normal mode when main power 105 supplies power to the communication device 111. As previously discussed, the controller 140 operates the communication device 111 in a second power saving mode during a battery backup mode in which the communication device is powered via the battery 138 instead of the main power 105.

In one embodiment, the controller 140 implements variable power saving settings of the communication device 111 during the second power saving mode (battery backup mode) depending on conditions of operating the communication device in the normal mode. For example, the controller 140 may detect that the head-of-household or users associated with communication device 111 in subscriber domain 151 typically use phone 141 and rarely use phone 142. In such an instance, in one embodiment, in response to detecting that the amount of energy (charge) stored in the battery is detected as being below a threshold value (such as 50 percent), the controller 140 implements further power savings during the battery backup mode by depowering port P2 and providing continued power to only to port P1. This enables communications from phone 141 but disables communications from phone 142.

Accordingly, embodiments herein include retrieving or receiving usage information associated with the communication device and corresponding resources, analyze the usage of the communication device and corresponding resources during the normal mode non-battery backup mode, and implementing further power saving settings (power shedding) of the communication device 111 during the power savings mode.

Section B

In accordance with further example embodiments, the conventional operational power saving modes such as Power Shedding, Power Doze, and Sleep—modes as previously discussed can be used in conjunction with any of the novel power savings modes as described herein.

In one embodiment, power savings are continuously gained during normal operations with the above conventional techniques, in accordance with embodiments herein. For example, phone access can be prioritized during battery backup mode such as via a new battery savings mode being in effect during a main power 105 outage event. These two modes, normal power saving mode (FIG. 1) and main outage power savings mode (FIG. 3), are complimentary and provide a unique solution by optimizing different aspects of power saving depending on the conditions of normal operations or emergency needs.

Section C

Yet further example embodiments herein include providing deeper power saving when the communication management resource 115 (such as an OAM) receives a message from communication device 111 over communication link 126. In one embodiment, the message from the controller 140 (or other suitable entity) includes Event code 0x51 (a value) (FIG. 5) from the communication device 111. The event code 0x051 indicates that the communication device 111 is operated on battery power due to a main power 105 failure.

Note that the communication management resource 115 (such as OLT) may receive other important information about the communication device 111 (such as ONU), including telemetry data from a telemetry server located in a company data center. For example, a received OAM message such as DPoE Event code 0x0A07 (FIG. 7) from the communication device 111 indicates to the recipient (communication management resource 115) that the battery 138 charge capacity has dropped for example to below 50%.

Certain embodiments herein include implementing Artificial Intelligence (AI) driven server to analyze all of the collected telemetry data from this communication device 111 (ONU) over time. Such telemetry information may indicate conditions such as a phone off hook condition associated with phones 141, 142, etc., and/or any user data traffic being transmitted by this communication device 111 (ONU).

In yet further example embodiments, based on the status information (such as notification that battery charge is less than 50%) collected from the communication device 111 and/or the power source 131, the AI (Artificial Intelligence) server resource 317 (or other suitable entity such as monitor system 305 in communication with the communication management resource 115) issues an API command to the specific communication management resource 115 (OLT), instructing the communication management resource 115

(OLT) to transition the communication device 111 (ONU) to a sleep mode to further save its battery power. This sleep mode during emergency power savings mode further reduces the energy demands of the communication device 111 (ONU) and extends the usable charge of the battery 138 to support the more critical needs of voice calls (via phone devices 141 and 142) or other important telemetry messaging during the battery backup mode.

In yet further example embodiments, during a battery backup mode in which the communication device 111 is powered via the battery backup source (battery 138) instead of the main power 105, assume that the controller 140 detects an event associated with the battery 138 such as that charge on the battery 138 is below a threshold value. In response to detecting the event, the controller 140 communicates a message over the communication link 126 to communication management resource 115. The message notifies the controller 140 of the detected event (battery charge below 50% or other suitable value).

Thus, in one embodiment, the detected event is detection of available power in the battery 138 being below a threshold value. In such an instance, the communication management resource 115 receives communications over the communication link 126 from the controller 140.

In one embodiment, the communication management resource 115 or other suitable resource generates control settings to be implemented by the communication device 111. For example, the received communications from the communication management resource 115 can indicate settings of the communication device 111 that are to be applied by the controller 140 during the battery backup mode in response to detection of an event such as that charge in the battery 138 is below a threshold value. In accordance with the received settings from the communication management resource or other suitable resource, the controller 140 implements the received settings as specified by the communications, the implemented settings further reducing power consumption by the communication device in the battery backup mode.

Thus, embodiments herein include real-time or near real-time control of the communication device 111 and corresponding power consumption based on the status information associated with the power source 131 and/or communication device 111 communicated from the communication device 111 to the communication management resource 115 or other target entity in network environment 100.

In yet further example embodiments, during a battery backup mode in which the communication device is powered via the battery backup source 138, the communication device 111 receives a command over the communication link 126 from communication management resource 115 (such as OLT) or a Back office Server Resource (such as monitor system 305) to operate in a further power savings mode. The controller 140 executes and/or applies the command to the communication device 111 and/or power source 131. In one embodiment, the communication device 111 communicates a confirmation message from the communication device 111 over the communication link 126 to the communication management resource 115 or a Back office Server Resource such as monitor system 305; the confirmation message indicates execution of the command by the controller 140 and/or the power management resource 137.

The confirmation message can be generated by any suitable resource. For example, a message from the controller 140, agent A1, agent A2, etc., can include a confirmation that a command was executed. Thus, confirmation from the controller 140 (or other suitable entity) over network 190 to the communication management resource 115 can include a positive acknowledgement (indicating command executed) or negative acknowledgement (indicating command not executed) indicating whether a respective function associated with the command was performed or not. An example of the command can include implementing, from the controller 140, a received firmware update to the power source 131 (smart battery) and providing notification to the communication management resource 115 that a respective firmware update was applied to the power source 131.

Section D

Further embodiments herein include the observation that some telemetry messages are important, or even critical to make business decisions and these telemetry messages require a new type of OAM messages to complete the communications gap between the communication device 111 (ONU) and the communication management resource 115 (OLT). Periodic telemetry results from the agents A1 and A2 (such as ONU's integrated ATA (I-ATA)) can report, for example, if a phone is off-hook, and for how long. In one embodiment, such information is used to plan back-office support plans and identify frequent users for enhanced service offers.

For example, in one embodiment, a new OAM message with DPoE event code 0x063 from the controller 140 to the communication management resource 115 indicates to the communication management resource 115 (or other suitable entity) that a phone (such as phone 141) connected to the I-ATA is off-hook.

In yet further example embodiments, periodic sampling of the status associated with the one or more components of the communication device 111 indicate a respective phone device usage status. For example, in one embodiment, the status associated with a monitored phone device 141 indicates the duration of one or more phone calls, how often phone calls are made during normal mode and battery backup mode, etc.

Note that the communication system can be configured to use AI (Artificial Intelligence) to derive patterns of use to identify which customers are eligible for enhanced telephony service plans based on their telephony usage frequency and duration. This novel feature can include the creation of new OAM messages (from communication device 111) and use of AI to provide deeper use patterns for the purpose of effectively targeting users for specific new offers.

In yet further example embodiments, via an agent A1 associated with the communication device 111 during a battery backup mode in which the communication device 111 is powered via the battery 138, the agent A1 (or other suitable resource in the communication device 111) monitors a status of a phone device 141 coupled to the communication device 111. The agent A1 or controller 140 communicates a message received from the agent A1 over the communication link 126 to the communication management resource 115. Such a message indicates a status of the respective use of the phone device 141. Accordingly, embodiments herein can include monitoring of components associated with the communication device 111 and providing feedback of same.

Note that the agent can be configured to monitor any suitable information and provide notification of same to controller 140, communication management resource 115, etc. In one embodiment, the status information from the agent indicates an amount of usage (such as how long the phone device is off-hook, amount of transmitted data, etc.) of the phone device 141 during the battery backup mode.

In one embodiment, depending on the status of the phone use or other monitored component in the communication device 111, the head-of-household associated with the communication device 111 receives notification of one or more service offers for additional services available to the respective subscriber domain and corresponding users.

Note that further embodiments herein include implementing a respective agent A2 or other suitable resource to perform testing and provide feedback of same during battery backup mode or normal mode. In one embodiment, assume that the agent A2 receives a command (such as from communication management resource 115 or other suitable resource over claim 126) to perform a test while in a battery backup mode in which the communication device 111 is powered via the battery backup source instead of the main power source. In response to receiving the command, the agent A2 initiates execution of a performance test such as a bandwidth and latency test. In general, the requested performance test tests an ability of the voice communication circuitry 121 to communicate over the communication link 126.

In one embodiment, to execute the performance test, the agent A2 communicates with the I-PERF resource 310. During communications with the resource 310, the agent A2 measures a round-trip time of and bandwidth capacity of communications between the agent A2 (or the phone device 141 or the voice communication circuitry 121) and the I-PERF resource 310. In accordance with further embodiments, the agent A2 or other suitable resource communicates a message over the communication link 126 to the communication management resource 115 (or other suitable entity) indicating the results of the test. The message indicates completion of the test and test results (such as available bandwidth and data latency associated with using the respective phone device 141, voice communication circuitry 121, etc.).

Section E

In accordance with further example embodiments, newer 'smart batteries' such as the EBBU are beginning to enter the marketplace. Currently, a CPE device such as a Cable Modem sends many messages to an SNMP collector using MIBs that are already defined in specifications such as CableLabs' DPoE-SP-OAMv2.0413-180228-BB. Existing OLT-initiated ONU power-saving communications are specified in Standards such as the IEEE Std. 1904.1 (SIEPON) and CableLabs' DPoE-SP-OAMv2.0-I13-190228-BB specification. However, there is no standard or specification to date that defines OAM messages to communicate the messaging to and from smart batteries such as the EBBU (such as power source 131). Embodiments herein include creating novel OAM messages for use in GPON, EPON and other Optical standards by specifying and incorporating new OAM messages in four general areas as specified by the following drawings and description.

Figure 4:
FIG. 4 is an example diagram illustrating of command and control messages according to embodiments herein.

FIG. 4 is an example diagram illustrating of command and control messages according to embodiments herein.

This example embodiment illustrates control messaging (such as management commands 400) generated by the communication management resource 115 (such as an OLT—Optical Line Termination system) or other suitable resource. Note that management commands 400 can support any suitable type of command/control functions such as battery reboot, reset, or other battery behavior.

In yet further example embodiments, the communication management resource 115 or other suitable entity communicates a respective command 410 (such as a data value 0x0016 in a respective message) over network 190 and through the communication interface 120 to the controller 140. In one embodiment, the command 410 is directed to controlling the power source 131.

In response to receiving the command 410 directed to control the power source 131, the controller 140 (controller) communicates the received command (or translates the command into a further command that is communicated) over communication link 127 (such as a bidirectional communication link) to the power management resource 137 of power source 131. The power management resource 137 executes a corresponding function (such as a reset of circuitry as indicated by the command) associated with the received command 410. Accordingly, via communications over network 190, a remote management resource (such as communication management resource 115 or other suitable entity) is able to control the power source 131 via communications through and implemented by the communication device 111.

FIG. 5 is an example diagram illustrating battery backup management notifications according to embodiments herein.

This example embodiment illustrates messaging such as including status information associated with the communication device 111 and/or the power source 131. In one embodiment, the status information is alarm information.

In accordance with further example embodiments, the messages from the controller 140 to the communication management resource 115 (or other suitable entity) over network 190 indicate urgent event notifications received by the communication device 111 from the power management resource 137 (smart battery). Note that examples of status communicated from the controller 140 to the communication management resource 115 can include: No Battery, there is normal charge on the battery 138, there is low charge on the battery 138, the battery 138 is depleted of charge below a threshold value, etc.

In one embodiment, the controller 140 monitors and/or receives a status of the power source 131 and provides notification of a status of the power source 131 via different status information as specified by status codes 510 in FIG. 5 (such as indicating switchover of the communication device 111 to the battery backup mode, low battery charge condition associated with the battery 138, etc. Thus, the communication device 111 monitors a status of the power source 131 and uses different status codes 510 to indicate different status conditions.

Assume that the communication device 111 receives a notification over the communication link 127 from the power management resource 137 indicating that the power source 131 and communication device 111 is operated in a battery backup mode in which the battery 138 produces the power 107 instead of main power 105. In such an instance, the controller 140 (controller) generates a respective message including status information 0x51 and communicates such information over network 190 to or through the communication management resource 115 to a respective target entity. The message informs the target entity of the status of the battery 138.

Thus, during a battery backup mode in which the communication device 111 is powered via the battery 138 (battery backup source) instead of the main power 105, the controller 140 communicates a message over the communication link 126 to the communication management resource 115. Such a message (0x51) notifies the communication management resource 115 (or other target entity) that the communication device 111 is operating in the battery backup mode, informing remote entity of a status of the communication device 111 and or respective power failure condition associated with main power 105.

Further status information (such as code 0x52) communicated from the controller 140 over the communication link 126 to the communication management resource 115 indicates that the amount of charge associate with the battery 138 falls below a respective threshold value such as 50 percent or other suitable value.

In one embodiment, in response to receiving notification that the charge available on the battery is below a threshold value (such as 50 percent or other suitable value), the communication management resource 115 or other suitable entity communicates a respective control message over the communication link 126 to the communication management resource 115. Assume that the control message received from the communication management resource 115 includes settings to be applied to the circuitry of the communication device 111. The settings indicate to further depower one or more specific circuits associated with the communication device 111 that have not yet been depowered in the communication device 111 during the battery backup mode. Accordingly, embodiments herein include the controller 140 receiving communications over the communication link 126 from the controller 140 during the battery backup mode and applying such received settings (such as depowering circuitry) to the communication device 111 to increase how long the voice communication circuitry 121 can be powered to support communications.

In accordance with further example embodiments, any of one or more resources such as controller 140, agent A1, agent A2, etc., monitors an attribute of the communication device 111 during a battery backup mode in which the communication device 111 is powered via the battery 138. In such an instance, the monitoring entity produces status information associated with the monitored attribute. In a manner as previously discussed, the controller 140 communicates the collected status information through the communication interface 120 over the communication link 126 to any suitable destination device.

FIG. 6 is an example diagram illustrating subscriber domain management and messaging according to embodiments herein.

This example embodiment illustrates communicating messages such as including status information associated with the communication device 111 and/or the voice communication circuitry 121. For example, the status information associated with the communication device 111 can be collected and or communicated from any suitable resource such as controller 140, agent A1, agent A2, etc., through the communication interface 120 over network 190 to the communication management resource 115 or other suitable entity.

In a more specific embodiment, assume that the agent A1 (such as implemented in the communication device 111 or coupled to a corresponding port of the communication device 111) monitors conditions associated with the phone devices 141 and 142 (such as an off-hook condition of each of the phone devices 141 and 142). Assume that the agent A1 is assigned a network address XX1. Via communication of a respective message (such as indicating a respective monitored condition of the phone devices 141 and 142) from the agent A1 through the communication interface 120 to an appropriate target entity in network environment 100, the target entity is made aware of the current conditions (such as an amount of usage, off-hook condition, etc.) associated with each of the phone devices 141 and 142.

As a further example, the communicated status information can be any suitable information such as a detected off-hook condition (such as indicated by 0x63, or 0x64) associated with one or more of phones 141, 142, etc.

Additionally, or alternatively, note that the status information communicated from a respective agent and/or controller 140 over the communication link 126 to the communication management resource 115 or other suitable entity in network environment 100 can indicate information such as CPU utilization (as indicated via status code 0x65) with a corresponding data value indicating percent utilization, CPU temperature (such as indicated via status code 0x66) with a corresponding data value indicating a temperature of a respective component in the communication device 111 or the power source 131.

FIG. 7 is an example diagram illustrating battery backup information according to embodiments herein.

This example embodiment illustrates status messaging such as including status information associated with the communication device 111 and/or the power source 131. The status information can be alarm information or any other suitable information.

In one embodiment, the messages from the controller 140 indicate urgent event notifications such as transmitted between the power source 137 (smart battery) and the communication management resource 115 or other target device in communication with the communication management resource 115. Examples of status can include: No Battery, Normal Charge on battery, Low Charge on battery, Depleted Charge on battery, etc.

Note that the status information can further include non-urgent and urgent probing of the status of various components, levels, and/or states associated with the power source 131. Examples of information (via communications 139) received by the communication device 111 over the communication link 126 as indicated by status information 710 in FIG. 7 include: information such as Manufacturer (code 0xA02), Model and Firmware Versions, List of current Alarms, Minutes Remaining on Current Battery Charge, etc.

Figure 8:
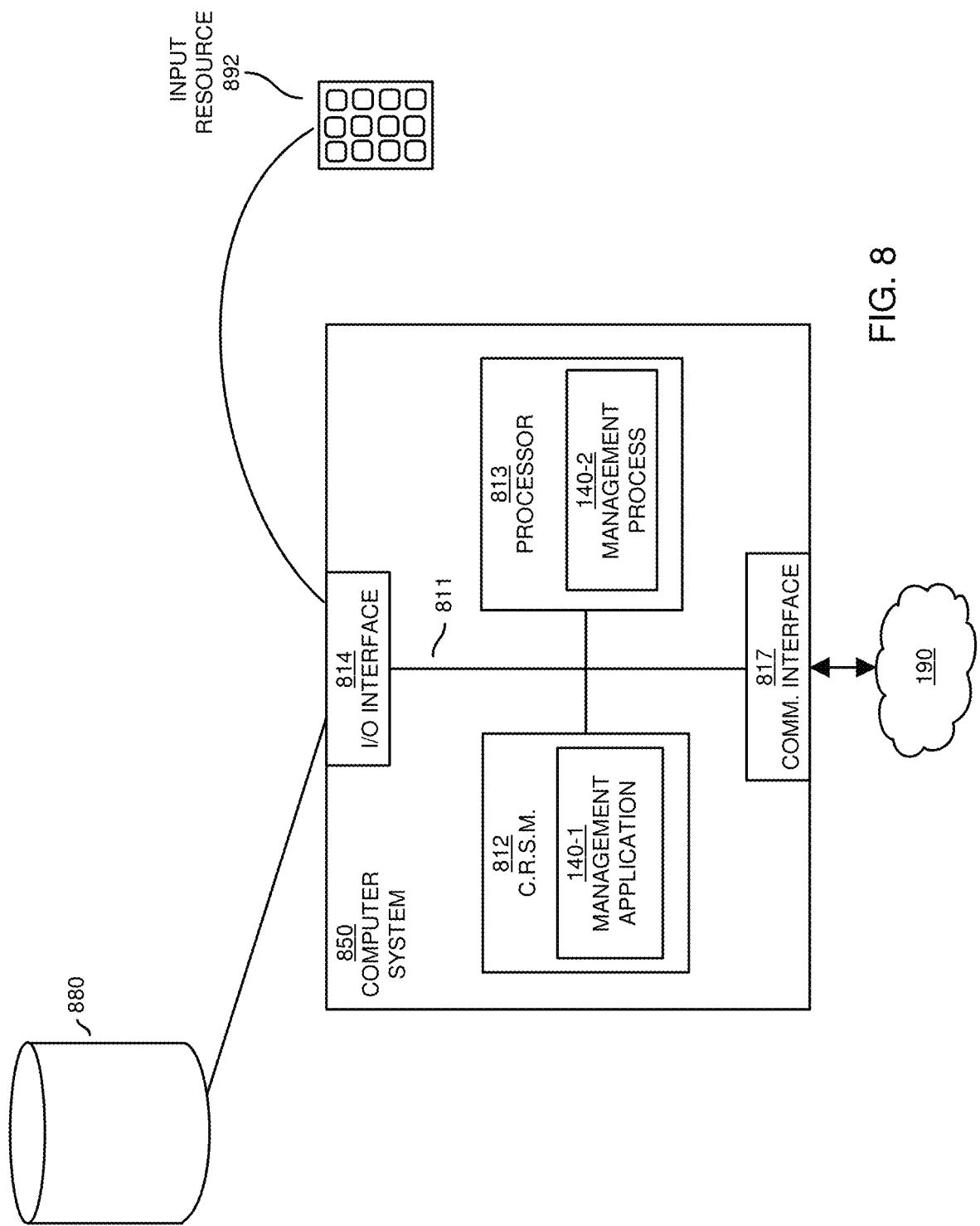
FIG. 8 is an example diagram illustrating example computer hardware and software operable to execute operations according to embodiments herein.

In accordance with further embodiments, note that MIB (Management Information Base) messages for other adjuncts to the communication device 111 (such as an ONU) would also require new OAM messages to corresponding MIBs. Below is a non-exhaustive list of EBBU (External Battery Backup Unit) MIB messages that could be used if new OAM messages were created:

upsOutputVoltage
    upsAlarmsPresent
    upsAlarmDescr—upsAlarmShutdownPending
    upsAlarmDescr—upsAlarmShutdownImminent
    upsConfigLowBattTime
    upsConfigAudibleStatus
    mtaDevPwrSupplyB atteryTest
    mtaDevPwrSupplyConfigReplaceBatteryTime
    mtaDevPwrSupplyB atteryTestTime
    upsFirmwareupgrade
    upsB atteryPosition
    upsIdentName
    upsIdentAttachedDevices
    upsEstimatedMinutesRemaining
    upsAlarmDescr—upsAlarmBatteryBad
    upsAlarmDescr—upsAlarmOutputOffAsRequested
    upsAlarmDescr—upsAlarmUpsOutputOff
    upsAlarmDescr—upsAlarmGeneralFault
    upsAlarmDescr—upsAlarmAwaitingPower
    upsShutdownType
    upsShutdownAfterDelay upsConfigOutputVA
upsConfigOutputPower
upsEstimatedMinutesRemaining
mtaDevPwrSupplyRatedMinutes
mtaDevPwrSupplyAvailableMinutes
mtaDevPwrSupplyFullChargeTime
mtaDevPwrSupplyConfigRunTim FIG. 8 is an example block diagram of a computer system for implementing any of the operations as previously discussed according to embodiments herein.

Note that any of the resources (such as mobile communication devices, user equipment, wireless stations, wireless base stations, communication management resource, control management resource, etc.) as discussed herein can be configured to include computer processor hardware and/or corresponding executable instructions to carry out the different operations as discussed herein.

For example, as shown, computer system 850 of the present example includes interconnect 811 coupling computer readable storage media 812 such as a non-transitory type of media (which can be any suitable type of hardware storage medium in which digital information can be stored and or retrieved), a processor 813 (computer processor hardware), I/O interface 814, and a communications interface 817.

I/O interface(s) 814 supports connectivity to repository 880 and input resource 892.

Computer readable storage medium 812 can be any hardware storage device such as memory, optical storage, hard drive, floppy disk, etc. In one embodiment, the computer readable storage medium 812 stores instructions and/or data.

As shown, computer readable storage media 812 can be encoded with management application 140-1 (e.g., including instructions) in a respective wireless station to carry out any of the operations as discussed herein.

During operation of one embodiment, processor 813 accesses computer readable storage media 812 via the use of interconnect 811 in order to launch, run, execute, interpret or otherwise perform the instructions in management application 140-1 stored on computer readable storage medium 812. Execution of the management application 140-1 produces management process 140-2 to carry out any of the operations and/or processes as discussed herein.

Those skilled in the art will understand that the computer system 850 can include other processes and/or software and hardware components, such as an operating system that controls allocation and use of hardware resources to execute the management application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 850 may reside at any location or can be included in any suitable resource in any network environment to implement functionality as discussed herein.

Functionality supported by the different resources will now be discussed via flowcharts in FIG. 9. Note that the steps in the flowcharts below can be executed in any suitable order.

FIG. 9 is a flowchart 900 illustrating an example method according to embodiments herein. Note that there will be some overlap with respect to concepts as discussed above.

In processing operation 910, the controller 140 operates the communication device 111 in a normal operational mode in which the communication device 111 is powered via a main power 105. The communication device 111 supports voice communications over a respective communication link via first circuitry (such as voice communication circuitry 121) and non-voice communications via second circuitry (such as non-voice communication circuitry 122).

In processing operation 920, the controller 140 receives, from power management resource 132, notification indicating that the communication device 111 operates in a battery backup mode in which the communication device 111 is powered via a battery backup source (i.e., battery 133) instead of the main power 105.

In processing operation 930, in response to receiving the notification of operating the communication device 111 in the battery backup mode, the controller 140 depowers the second circuitry and powers the first circuitry of the communication device.

In processing operation 940, if the main power 105 is restored after the outage, the controller 140 receive a notification from the power management resource 137 to switchover to a normal operational mode in which the controller 140 powers-up the second circuitry (non-voice communication circuitry 122) of the communication device 111 again.

Note that additional operations associated with the communication device 110 have been discussed above.

In accordance with further example embodiments, the communication device 111 can still be sleeping even though it is powered via the main power 105 and there is no power failure. This may be due to the customer being away from home and there is no traffic on the home network for extended period of time. In such an instance, the controller 140 can be configured to operate the communication device 111 in a non-emergency power saving mode.

Note again that techniques herein are well suited to facilitate collection of information from one or more wireless station and distribution of the information over a network to a communication management resource. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
    operating a communication device in a normal operational mode in which the communication device is powered via a main power source, the communication device supporting voice communications over a communication link via first circuitry and non-voice communications over the communication link via second circuitry;
    from a power management resource, receiving notification indicating that the communication device is supplied with power in accordance with a battery backup mode in which the communication device is powered via a battery backup source instead of the main power source;
    via a controller of the communication device, in response to receiving the notification, providing continued power to the first circuitry and depowering the second circuitry of the communication device; and
    during the battery backup mode, testing an ability to communicate over the communication link.

2. The method as in claim 1, wherein powering the first circuitry includes:
    during the battery backup mode in which the communication device is powered via the battery backup source instead of the main power source, continuously powering both a transmitter interface and a receiver interface of the communication device that provides phone connectivity through the communication device over the communication link to a remote destination.

3. The method as in claim 1 further comprising:
    operating the communication device in a first power saving mode during the normal operational mode; and
    operating the communication device in a second power saving mode during the battery backup mode in which the communication device is powered via the battery backup source instead of the main power source.

4. The method as in claim 3 further comprising:
    implementing variable power saving settings of the communication device during the second power saving mode depending on conditions of operating the communication device in the normal operational mode.

5. The method as in claim 1 further comprising:
    during the battery backup mode in which the communication device is powered via the battery backup source instead of the main power source, communicating a message over the communication link to a communication management resource, the message notifying the communication management resource that the communication device is operating in the battery backup mode.

6. The method as in claim 5 further comprising:
    receiving communications over the communication link from the communication management resource, the communications controlling settings of the communication device during the battery backup mode.

7. The method as in claim 1 further comprising:
    during the battery backup mode in which the communication device is powered via the battery backup source instead of the main power source, detecting an event associated with the battery backup source; and
    in response to detecting the event, communicating a message over the communication link to a communication management resource, the message notifying the communication management resource of the event.

8. The method as in claim 7, wherein the event is detection of available power in the battery backup source being below a threshold value, the method further comprising:
    receiving communications over the communication link from the communication management resource, the communications controlling settings of the communication device during the battery backup mode in response to occurrence of the event; and
    implementing the settings as specified by the communications, the implemented settings further reducing power consumption by the communication device in the battery backup mode.

9. The method as in claim 7, wherein the communication management resource is operative to: i) retrieve usage information associated with the communication device, the usage information indicating usage of the communication device during the normal operational mode, ii) via the usage information, analyze usage of the communication device during the normal operational mode, and iii) produce settings controlling the communication device.

10. The method as in claim 1 further comprising:
    via execution of an agent associated with the communication device during the battery backup mode in which the communication device is powered via the battery backup source, monitoring a status of a phone device coupled to the communication device; and
    communicating a message from the agent over the communication link to a communication management resource, the message indicating a status of respective use of the phone device.

11. The method as in claim 10, wherein the status indicates an amount of usage of the phone device during the battery backup mode.

12. The method as in claim 10 further comprising:
    receiving an offer for a service depending on the status of the phone device.

13. The method as in claim 1 further comprising:
at the communication device, receiving a command to perform a test while in the battery backup mode in which the communication device is powered via the battery backup source instead of the main power source; and
in response to receiving the command, initiating execution of a performance test, the performance test testing the ability to communicate via the second circuitry over the communication link.

14. The method as in claim 13 further comprising:
communicating a message over the communication link to a communication management resource, the message indicating completion of the test.

15. The method as in claim 1 further comprising:
at the communication device, during the battery backup mode in which the communication device is powered via the battery backup source, receiving a power control command over the communication link; and
communicating the power control command to the power management resource, the power management resource executing the command and reducing power consumption by the communication device while in the battery backup mode.

16. The method as in claim 15 further comprising:
from the communication device, communicating a confirmation message from the communication device over the communication link, the confirmation message indicating execution of the power control command by the power management resource.

17. The method as in claim 1 further comprising:
receiving a communication from the power management resource during the battery backup mode in which the communication device is powered via the battery backup source, the communication indicating a status of the power management resource; and
transmitting the communication from the communication device over the communication link to a communication management resource.

18. The method as in claim 1 further comprising:
monitoring an attribute of the communication device during the battery backup mode in which the communication device is powered via the battery backup source;
producing status information associated with the monitored attribute; and
communicating the status information over the communication link to a destination device.

19. A system comprising:
a controller in communication with a communication device, the communication device including: i) first circuitry supporting transmission of voice communications over a communication link, and ii) second circuitry supporting transmission of non-voice communications over the communication link, the controller operable to:
during a normal operational mode in which the communication device is powered via a main power source, power both the first circuitry and the second circuitry;
receive, from a power management resource, a notification indicating that the communication device is being operated in a battery backup mode in which the communication device is powered via a battery backup source instead of the main power source; and
in response to receiving the notification, providing continued power to the first circuitry and depower the second circuitry of the communication device; and
during the battery backup mode, test an ability to communicate over the communication link.

20. The system as in claim 19, wherein the controller is further operative to:
during a main power outage in which the communication device is powered via the battery backup source instead of the main power source, continuously powering both a transmitter interface and a receiver interface of the communication device that provides phone connectivity through the communication device over the communication link to a remote destination.

21. The system as in claim 19, wherein the controller is further operative to:
operate the communication device in a first power saving mode during the normal operational mode; and
operate the communication device in a second power saving mode during the battery backup mode in which the communication device is powered via the battery backup source instead of the main power source.

22. The system as in claim 21, wherein the controller is further operative to:
implement variable power saving settings of the communication device during the second power saving mode depending on conditions of operating the communication device in the normal operational mode.

23. The system as in claim 19, wherein the controller is further operative to:
during a battery backup mode in which the communication device is powered via the battery backup source instead of the main power source, communicate a message over the communication link to a communication management resource, the message notifying the communication management resource that the communication device is operating in the battery backup mode.

24. The system as in claim 23, wherein the controller is further operative to:
receive communications over the communication link from the communication management resource, the communications controlling settings of the communication device during the battery backup mode.

25. The system as in claim 19, wherein the controller is further operative to:
during the battery backup mode in which the communication device is powered via the battery backup source instead of the main power source, detect an event associated with the battery backup source; and
in response to detecting the event, communicate a message over the communication link to a communication management resource, the message notifying the communication management resource of the event.

26. The system as in claim 25, wherein the event is detection of available power in the battery backup source being below a threshold value, the controller further operative to:
receive communications over the communication link from the communication management resource, the communications controlling settings of the communication device during the battery backup mode in response to receiving notification of the event; and implement the settings as specified by the communications, the implemented settings further reducing power consumption by the communication device in the battery backup mode.

27. The system as in claim 26, wherein the communication management resource is operative to: i) retrieve usage information associated with the communication device, ii) as indicated by the usage information, analyze usage of the communication device during the normal operational mode, and iii) produce settings controlling the communication device.

28. The system as in claim 19, wherein the controller is further operative to:
via an agent executed in the communication device during the battery backup mode in which the communication device is powered via the battery backup source, monitor a status of a phone device coupled to the communication device; and
communicate a message from the agent over the communication link to a communication management resource, the message indicating a status of respective use of the phone device.

29. The system as in claim 28, wherein the status indicates an amount of usage of the phone device.

30. The system as in claim 28, wherein the controller is further operative to:
receive an offer for a service depending on the status of the phone device.

31. The system as in claim 19, wherein the controller is further operative to:
receive a command to execute a performance test while in the battery backup mode in which the communication device is powered via the battery backup source instead of the main power source; and
in response to receiving the command, initiate execution of the performance test, the performance test testing an ability to communicate over the communication link.

32. The system as in claim 31, wherein the controller is further operative to:
communicate a message over the communication link to a communication management resource, the message indicating completion of the test.

33. The system as in claim 19, wherein the controller is further operative to:
during the battery backup mode in which the communication device is powered via the battery backup source, receive a command over the communication link; and
communicate the command to the power management resource, the power management resource executing the command.

34. The system as in claim 33, wherein the controller is further operative to:
from the communication device, communicate a confirmation message from the communication device over the communication link, the confirmation message indicating execution of the command by the power management resource.

35. The system as in claim 19, wherein the controller is further operative to:
receive a communication from the power management resource during the battery backup mode in which the communication device is powered via the battery backup source, the communication indicating a status of the power management resource; and
transmit the communication from the communication device over the communication link to a communication management resource.

36. The system as in claim 19, wherein the controller is further operative to:
monitor an attribute of the communication device during the battery backup mode in which the communication device is powered via the battery backup source;
produce status information associated with the monitored attribute; and
communicate the status information over the communication link to a destination device.

37. Computer-readable storage hardware having instructions stored thereon, the instructions, when carried out by computer processor hardware, cause the computer processor hardware to:
operate a communication device in a normal operational mode in which the communication device is powered via a main power source, the communication device supporting voice communications over a communication link via first circuitry and non-voice communications over the communication link via second circuitry;
from a power management resource, receive notification indicating that the communication device is powered via a battery backup source instead of the main power source;
in response to receiving the notification, power the first circuitry and depower the second circuitry of the communication device; and
during the battery backup mode, test an ability to communicate over the communication link.

38. The method as in claim 1, wherein connectivity between the controller and the power management resource is a bidirectional communication link.

39. The method as in claim 1 further comprising:
at the communication device, while in the battery backup mode in which the communication device is powered via the battery backup source:
receiving a power control command over the communication link; and
executing the power control command to reduce power consumption by the communication device.

40. The method as in claim 13, wherein the performance test includes testing a bandwidth supported by the communication link during the battery backup mode.

41. The method as in claim 13, wherein the performance test includes testing a latency of communications transmitted over the communication link.

42. The method as in claim 13 further comprising:
communicating a message over the communication link to a communication management resource, the message indicating performance associated with the communication link as detected from executing the performance test.

43. The method as in claim 1 further comprising:
monitoring a charge level of the battery backup source; and
in response to detecting that the charge of the backup source falls below a threshold level during the battery backup mode, communicating a message over the communication link to a communication management resource, the message indicating that the charge level of the battery is below the threshold level.

44. The method as in claim 43 further comprising:
in response to communicating the message over the communication link to the communication management resource, receiving a command from the communication management resource indicating to further reduce power consumption by the communication device while the communication device is supplied with power from the battery backup source during the battery backup mode.

45. The method as in claim 1 further comprising:
while the communication device is supplied with power from the battery backup source during the battery backup mode, further reducing power consumption by the communication device in response to detecting that a charge level of the battery backup source falls below a threshold level.

46. The method as in claim 1, wherein testing the ability to communicate over the communication link includes testing a bandwidth supported by the communication link during the battery backup mode, testing of the bandwidth including the communication device communicating over the communication link with a remote resource.

47. The method as in claim 1, wherein testing the ability to communicate over the communication link during the battery backup mode includes testing a latency of communications transmitted over the communication link.

48. The method as in claim 1 further comprising:
transmitting a message over the communication link to a communication management resource, the message notifying the communication management resource of the ability of the communication device to communicate over the communication link during the battery backup mode.

* * * * *